United States Patent [19]

Franke

[11] 4,038,954

[45] Aug. 2, 1977

[54] MULTI-CYLINDER INTERNAL COMBUSTION ENGINE

[75] Inventor: Walter Franke, Seevetal, Germany

[73] Assignee: Motoren-Forschungs GmbH KG, Hamburg, Germany

[21] Appl. No.: 587,691

[22] Filed: June 17, 1975

Related U.S. Application Data

[63] Continuation-in-part of Ser. No. 402,171, Oct. 1, 1973, abandoned.

[30] Foreign Application Priority Data

Sept. 29, 1972 Germany .................... 2247908

[51] Int. Cl.² ................... F02B 75/18; F02B 25/00
[52] U.S. Cl. ..................... 123/75 CC; 123/75 RC
[58] Field of Search ............. 123/26, 75 RC, 75 CC, 123/75 C, 75 E, 73 PP, 73 SC

[56] References Cited

U.S. PATENT DOCUMENTS

| | | | |
|---|---|---|---|
| 1,168,879 | 1/1916 | Gass | 123/75 C |
| 1,825,959 | 10/1931 | Kondo | 123/75 CC |
| 3,756,206 | 9/1973 | Gommel | 123/75 CC |
| 3,906,908 | 9/1975 | Franke | 123/75 CC |
| 3,955,544 | 5/1976 | Franke | 123/75 CC |

FOREIGN PATENT DOCUMENTS 1,185,291  3/1970  United Kingdom ............ 123/75 RC

*Primary Examiner*—Ronald H. Lazarus
*Assistant Examiner*—Craig R. Feinberg

*Attorney, Agent, or Firm*—Toren, McGeady and Stanger

[57] ABSTRACT

A method of operating an internal combustion engine having one or a plurality of cylinders with piston means movable therein wherein a controlled quantity of compressed air is introduced into the combustion chamber when the piston is substantially in its bottom dead center position and about to begin a compression stroke or an exhaust stroke or only before the beginning of an exhaust stroke. The quantity of compressed air supplied is varied in dependence upon the load or output power of the engine. At lower engine speeds or lower output power a greater quantity of compressed air is introduced before each compression stroke. At higher engine speeds or higher output power a smaller quantity of compressed air is supplied prior to each compression stroke and each exhaust stroke. The scavenging and/or supercharging air is supplied at a pressure from about 7 to 43 psig, and at a temperature below 1470° F, or lower. In a multi-cylinder engine each cylinder may have beneath its piston a closure arrangement with valve means so that the volume between the piston and the closure functions as a compression chamber for supplying compressed air into the combustion chambers through associated conduits including valve means controlled by the engine. Alternately, a separate source of compressed air such as a compressor may be provided and connected through a valve assembly to the respective cylinders. The valve assembly is driven by the engine crank shaft and may be controlled by the accelerator pedal or a control lever of the engine.

12 Claims, 19 Drawing Figures

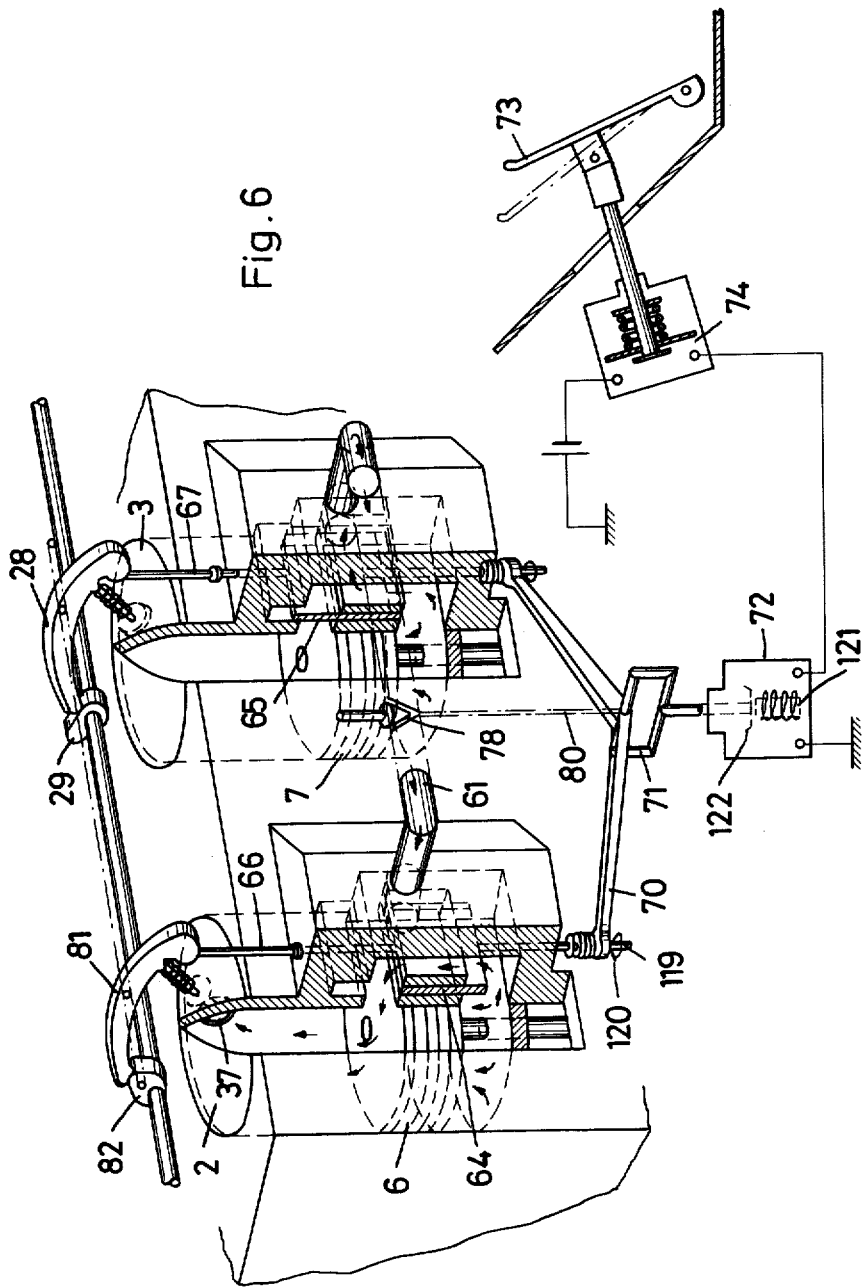

MULTI-CYLINDER INTERNAL COMBUSTION ENGINE

CROSS-REFERENCE TO RELATED APPLICATION

This application is a continuation-in-part of my co-pending application Ser. No. 402,171 filed Oct. 1, 1973 and now abandoned.

This invention relates to a method of operating an internal combustion engine by employing supercharging and scavenging with compressed air supplied from a source of compressed air. The invention furthermore relates to internal combustion engines either of the type of a multicylinder internal combustion engine with reciprocating pistons driving a crank shaft and wherein the combustion chambers are controlled by associated inlet and exhaust valves, or a rotary piston internal combustion engine with a piston rotating about an excenter shaft within a housing.

The exhaust problem is acquiring increasing importance in connection with air pollution. In this connection it is a starting point that an oxygen enrichment of the exhaust gas with or without after-burning already leads to a considerable reduction of objectionable constituents in the exhaust gas. After-burning, whether carried out in the exhaust or in the working chamber of a cylinder effects an oxygen enrichment leading to a substantially complete elimination of objectionable constituents. There is therefore a need for an improved method of operating an internal combustion engine in which the exhaust gas, especially during idling and at small output power levels is enriched with a considerable admixture of air.

In the U.S. Pat. No. 3,430,617 it has already been disclosed to provide a second ignition for after-burning during the exhaust stroke on opening of the exhaust valve in an Otto-cycle engine. In this connection, the transfer especially during the exhaust stroke is particularly advantageous. Such an after-ignition during the exhaust stroke is included as an advantageous refinement of the present invention.

It is an object of the present invention to provide a novel and improved method of operating an internal combustion engine.

It is another object of the present invention to provide a novel method of operating an internal combustion engine that may be adapted with minor modifications to conventional internal combustion engines.

It is a still further object of the present invention to provide a particularly simple method of operating an internal combustion engine to reduce the output of polluting substances.

It is a still further object of the present invention to provide a method of operating an internal combustion enging that may be employed in rotating piston combustion engines.

In accordance with the present invention there is now proposed a method of operating an internal combustion engine with supercharging and scavenging by means of compressed air supplied from a source of compressed air, the method comprising the steps of supplying a predetermined quantity of compressed air to the engine in dependence on the speed or the output power of the engine, either before each compression stroke and each exhaust stroke or only before each exhaust stroke, immediately before the respective stroke or the compression begins, in supplying, at lower speeds or reduced output power of the engine, a multiple of this quantity of the compressed air and particularly twice this quantity of air prior to the exhaust stroke, and in supplying, at higher speeds or within a higher output power range, an unvaried, small quantity of compressed air prior to each compression or exhaust stroke.

When employing a separate source of compressed air, conventional internal combustion engines may be operated in accordance with the inventive method. In this case, the source of compressed air consists of a compressor that may be driven by the crank shaft of the engine or by the exhaust gases. In a multi-cylinder piston type internal combustion engine the scavenging and/or supercharging air must be introduced into the cylinders through ports that are located adjacent the piston head when the respective pistons are in the bottom dead center position. By this expedient is generated what may be termed a "layer charge" that performs a buffer function in operation so that the well-known piston knocking in operating engines with petrols of a low lead content may largely be overcome. Preferably an increased quantity of air is introduced into the cylinder at low engine speeds.

The compressed air may be supplied to the cylinders at a pressure in the range from 7 to 43 psig and preferably from 28 to 43 psig, and at a temperature below 1470° F, and preferably below 392° F. This injection of virtually cold air leads to an instantaneous cooling of the gases within the working chamber of the cylinder and has the advantageous effect that the NO concentration is removed. This cooling effect, however, does not interfere with the reactivity to form exhaust gas pollutents so that virtually all of the oxygen is exhausted.

The inventive method may be carried out in a multi-cylinder internal combustion engine of the type described in the co-pending U.S. application Ser. No. 402,171, filed Oct. 1, 1973 with the title "Multi-Cylinder Internal Combustion Engine" by the same applicant. This multi-cylinder internal combustion engine comprises at least two cylinders, a piston and a piston rod movable in each cylinder, an inlet valve for each cylinder, an exhaust valve for each cylinder, a cam shaft for actuating the valves, closure means closing each cylinder beneath the piston therein, an aperture in each closure means for the associated piston rod, a valve means in each closure means, whereby the volume between the piston and the closure means functions as a compression chamber, conduit means connecting each compression chamber with the working chamber of the cylinder, whereby air compressed beneath the piston in the region of the lower dead center position thereof can flow around the piston into the working chamber of the cylinder, connecting means connecting the compression chambers of cylinders working in unison, valve means in the connecting means, and actuating means for actuating the valve means in dependence on the cam shaft with reference to the actuation of the exhaust valves in such a manner that both simultaneously effective compression chambers of two cylinders are each connected to the working chamber of a cylinder before the exhaust stroke thereof.

The control lever of the engine such as the accelerator pedal in a vehicle may be provided with a setting device being responsive to engine operation so that the interconnection between compression and working chambers of associated cylinders is interrupted when the engine operates at more than half of its output power. After each induction and working stroke is provided super-charging of the working chamber from the compression chamber.

The inventive method may also be practised in an internal combustion engine comprising, in combination, a plurality of cylinders each having an inlet port and an outlet port and additional port means, piston means defining a plurality of combustion chambers, each piston having an operating cycle including at least one compression stroke and an exhaust stroke, a source of compressed air, conduit means connecting the source of compressed air to the additional port means of the cylinders, control means, particularly a valve assembly in these conduit means, whereby in any transition from one speed or power output range to another speed or power output range of the engine the control means is actuated to control the connection of the source of compressed air via the cylinder additional port means to the combustion chambers in a manner so that compressed air is supplied to these combustion chambers in dependence on the speed or the power output of the engine and either before each compression stroke and each exhaust stroke or only before each exhaust stroke, immediately before the respective stroke or the compression begins, in supplying, at lower speeds or reduced ouput power, a multiple of this quantity of compressed air and particularly twice this quantity of air prior to the exhaust stroke, and in supplying, at higher speeds or within a higher output power range, an unvaried, small quantity of compressed air prior to each compression or exhaust stroke.

In the latter application, the scavenging and/or super-charging air is introduced into each cylinder through a port adjacent the piston head when the respective piston is in its bottom dead center position, i.e. is in the vicinity of the crank shaft. Each additional cylinder port may preferably be provided with a controlled valve.

In accordance with a preferred embodiment, the control means connected between the source of compressed air and the combustion chambers may comprise a rotary slide valve member rotatably coupled to the engine and driven by the engine in accordance with the operational cycle of the engine. The rotary slide valve member is adapted to selectively establish or interrupt communication of the source of compressed air with the additional ports of the combustion chambers whereby in any transition from one speed or power output range to another speed or power output range of the engine is varied the relative position of the rotary slide valve member with respect to the additional ports of the combustion chambers.

The method of the present invention may also be practised in rotary piston internal combustion engines having a piston rotating about an excenter shaft within a housing. In rotating piston combustion engines, the discshaped piston may be integral with the rotary slide valve control assembly. Alternately, the rotary slide valve assembly may be provided separately from the piston.

In an internal combustion engine having a plurality of cylinders with axially movable pistons therein, the additional ports of the cylinders for connection to the source of compressed air may be disposed at each cylinder at a point above the piston head and in close proximity thereto when the associated piston is in its bottom dead center position so that by upward movement of the piston the piston skirt or a slide element associated with the piston covers the respective port, each additional port being connected by a respective conduit to the rotary slide valve assembly, the rotary slide valve assembly including a slide valve member coupled to the crank shaft of the engine and wherein the operating cycle of the rotary slide valve member is adjustable in dependence on the speed and/or power output range of the engine to alter the timing of the opening and blocking of the additional ports with respect to the movement of the pistons or respectively piston skirts. The rotary slide valve assembly preferably includes a rotatably mounted slide valve housing adapted to be rotated to alter the operational cycle of the rotary slide valve member.

In a four cylinder four-stroke engine the rotary slide valve member includes a blocking sector adapted to block either of four evenly spaced outlet ports in the slide valve housing. By rotating the housing, the relative position of the blocking sector may be altered with respect to the housing outlet ports. In four-stroke engines having more than four cylinders either several rotary slide valves may be provided, or the blocking sector of the rotary slide valve member may be of a smaller size whereby the rotary adjustment of the housing is correspondingly decreased.

For rotating the slide valve housing, the accelerator pedal of the engine may be connected by a linkage to the slide valve housing, and the linkage may include a lost-motion connection adapted to be activated in a predetermined position of the accelerator pedal. The adjustment of the housing may then be effected by relatively simple mechanical members.

The slide valve housing may also be rotated by an indexing electromagnet adapted to be energized in a predetermined position of the accelerator pedal to pull the housing into a predetermined position. A return spring may be provided for withdrawing the housing into its normal position.

In an internal combustion engine with reciprocating pistons, valve means actuatable by respective valve shafts or push rods may be associated with each connecting port on a cylinder and may be adapted to be actuated by the standard cam shaft of the engine whereby a separate, additional cam shaft is provided for actuating the valves, the separate cam shaft being coupled to the standard cam shaft of the engine which is adapted to actuate the inlet and exhaust valves of the engine, and wherein the rotary position of the standard cam shaft with respect to the rotary position of the additional cam shaft may be adjusted by an adjustable gear train.

Other objects, features and advantages of the inventive method will be described with reference to the following detailed description of several preferred embodiments illustrated in the appended drawings. In these drawings, FIGS. 1–9 illustrate the application of the inventive method to a modified multi-cylinder internal combustion engine, and FIGS. 10–19 illustrate the application of the inventive method to a conventional four cylinder four-stroke engine.

In the drawings:

FIG. 6 is a perspective schematic view, partly in section, of a control assembly between adjacently located cylinders, corresponding in essentials to FIG. 5 but however with elements according to FIG. 2;

In the drawings, only these parts essential to the understanding of the invention have been shown. In all of the FIGS., like or mutually corresponding parts are indicated by the same reference numerals.

Figure 1:
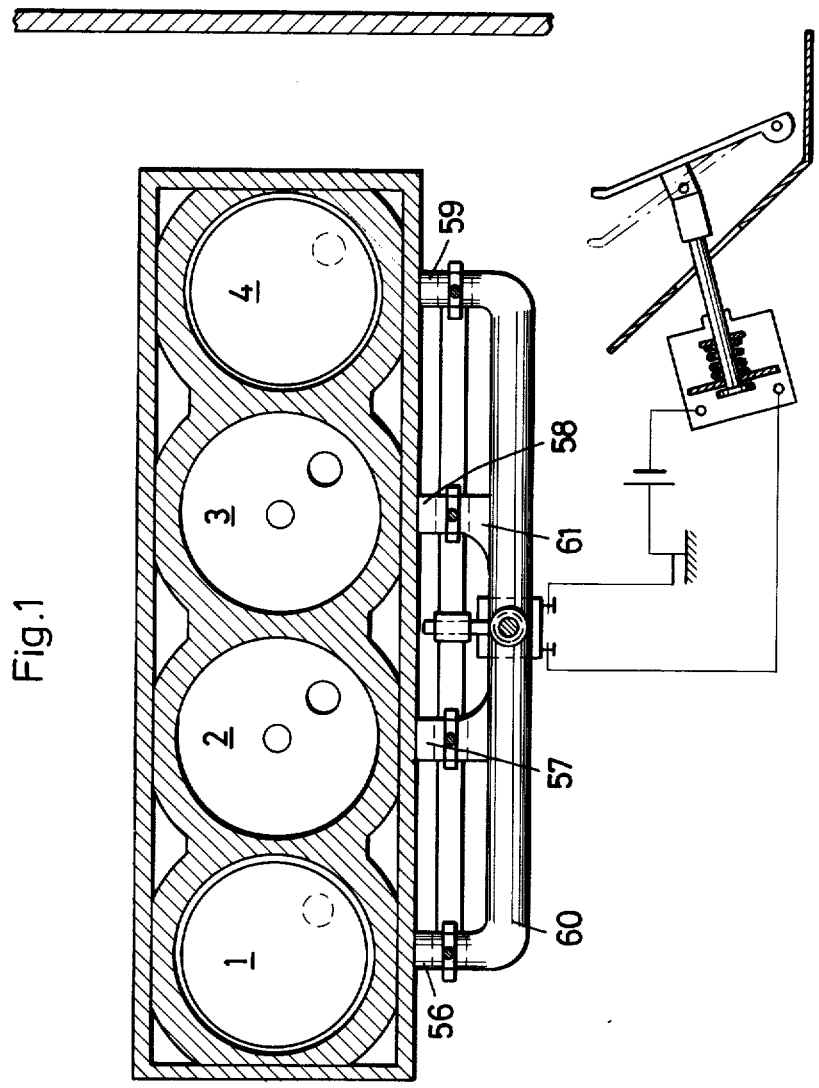
FIG. 1 is a partly schematic plan view of an in-line motor for practising the inventive method, the motor being shown partly in section.
Figure 2:
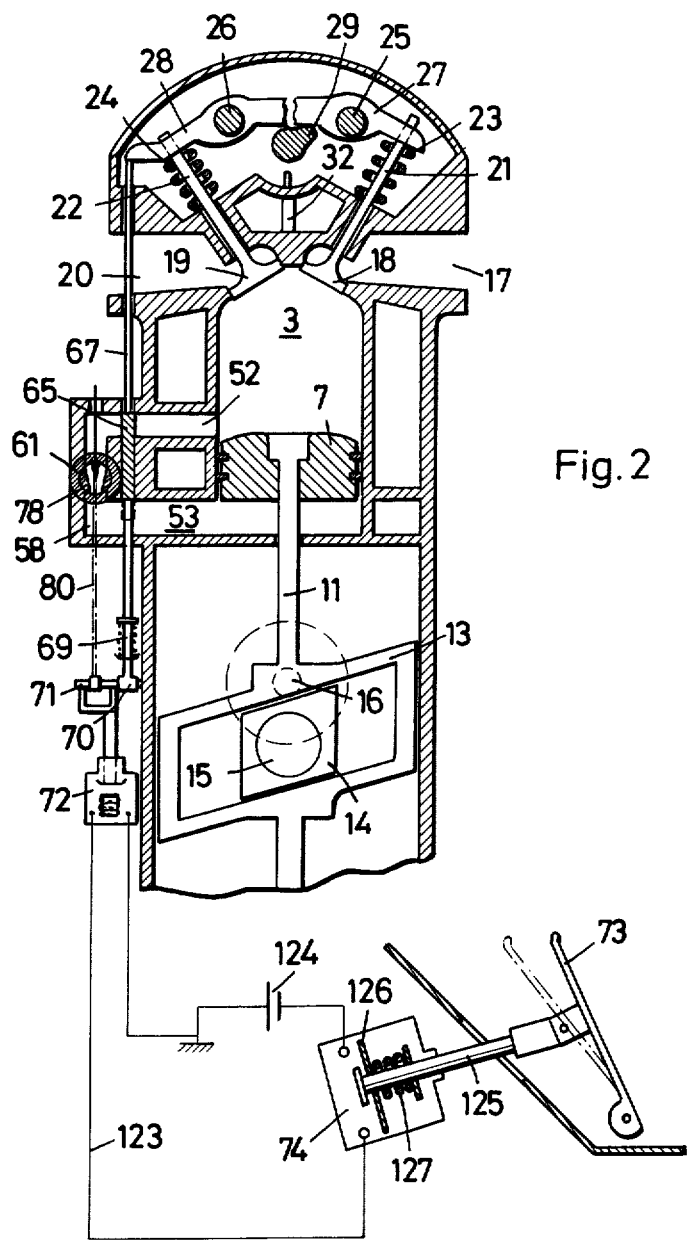
FIG. 2 is a front view of the motor of FIG. 1 on a section through one of the cylnders thereof.

The in-line motor or engine shown in FIGS. 1 through 5 is provided with four cylinders numbered respectively 1 through 4 in which are guided respective pistons 5 through 8 on respective piston rods 9 through 12. The piston rods, as shown in FIG. 2 in respect of the piston rod 11 by way of example, are arranged on slides 13 at an inclination to the direction of extension of the piston rods. In each of these slides is guided a block 14 in which is journalled a pin 15 of the crank shaft 16. The slides 13 because of the positioning thereof have the advantage of particularly easily going past the dead center position, and stroke characteristics which are advantageous in many respects.

Figure 4:
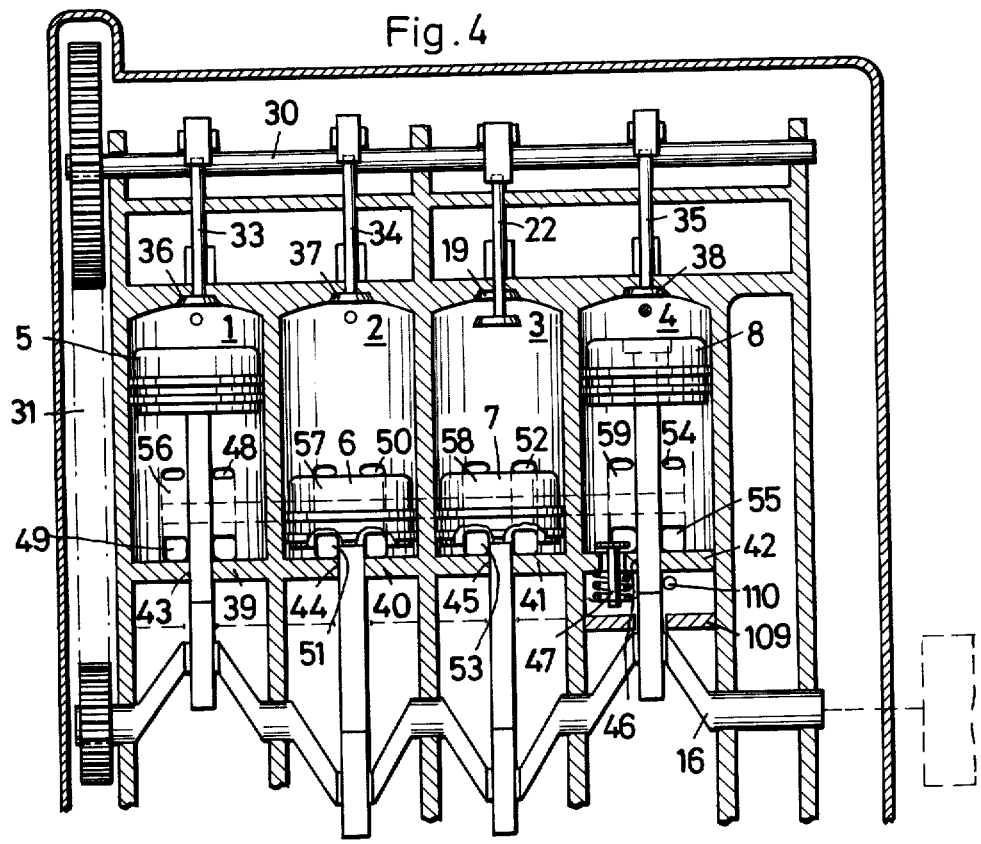
FIG. 4 is a view corresponding to FIG. 3, but with the motor being shown in a different operating position.

At each cylinder head there is arranged an inlet valve 18 in connection with an inlet duct 17 and also an outlet or exhaust valve 19 for an exhaust duct 20. The valve stems 21, 22 of these valves are actuated against springs 23, 24 by rocker arms 27, 28 pivotally mounted on shafts 25, 26 for actuation by a cam 29 on a cam shaft 30 (FIG. 4). This cam shaft is driven from the crank shaft 16 through a reduction gearing 31 so a to rotate with half the rotational speed of the crank shaft. This is conventional.

Figure 3:
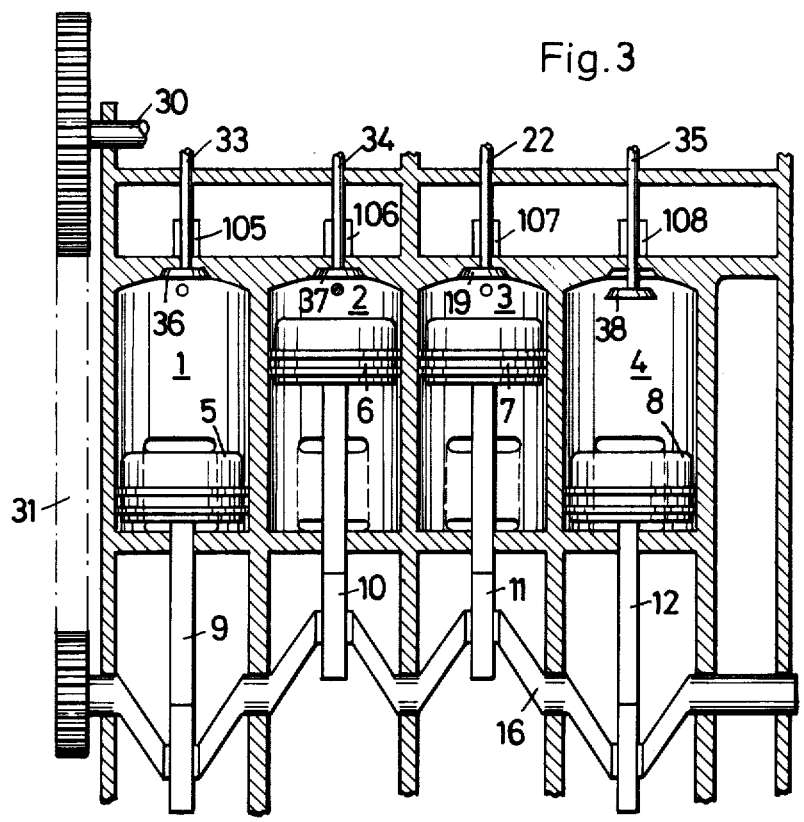
FIG. 3 is a side view of the motor of FIG. 1, in section along the middle line thereof, the motor being shown in a first operating position.

As will be seen from FIGS. 3 and 4, the pistons 5 and 8 on the one hand and 6 and 7 on the other hand are arranged to work in reciprocity, that is they are arranged to work in unison with the same stroke movement, the functions however being differently arranged in the known manner. The valve stems 22, 33 through 35 for the exhaust valves 19, 36 through 38 are each shown in both FIGS. 3 and 4. The engine for carrying out the method of the present invention is arranged to include at least a pair of cylinders having therein, respectively, at least a pair of pistons movable in unison.

Moreover ignition devices are located in the cylinder heads of which one is shown by the reference numeral 32 by way of example in FIG. 2. The ignition devices are indicated in FIG. 3 by reference numerals 105 through 108. They are connected in the usual manner with a distributor.

The cylinders 1 through 4 are closed underneath, that is beneath the pistons 5 through 8, with air compression chambers being formed thereat by respective walls 39 through 42, having respective slide openings or bushings 43 through 46 for the piston rods 9 through 12. The piston rod openings being effectively sealed, each of the walls is provided with a non-return or flap valve leading into the cylinder interior, as shown for example in FIG. 4 in the wall 42. The air supply for these valves 47 takes place from outside.

Underneath the valve 47 an intermediate wall 109 with guide opening or aperture for the piston rod 12 is advantageously provided. This space, which is sealed from the crank shaft case, is connected to the surroundings through an opening 110. Beneath the walls 39 through 41, as shown in broken lines, corresponding intermediate walls are provided and these walls are themselves provided with valves corresponding to the valves 47 as shown in broken lines.

At a spacing corresponding generally to the height of the pistons 5 through 8, ports 48, 49; 50, 51; 52, 53; 54, 55 from transfer conduits 56 through 59 open into the cylinders, the lower ports being directly above the walls 39 through 42. For example, the openings 52, 53 are connected to the transfer conduit 58 as shown in FIG. 2. The ports 48, 50, 52 and 54 are designated first port means and the ports 49, 51, 53 and 55 are designated second port means. The transfer conduits 56 to 69 are designated first conduit means.

As will be evident from FIG. 1, the transfer conduits 56 and 59 on the one hand and 57 and 58 on the other hand, that is, the transfer conduits of the pairs of cylinders which are co-ordinated with each other are connected together by second conduit means or connector ducts 60, 61. It is to be noted that two vertically spaced connector ducts are provided.

Figure 5:
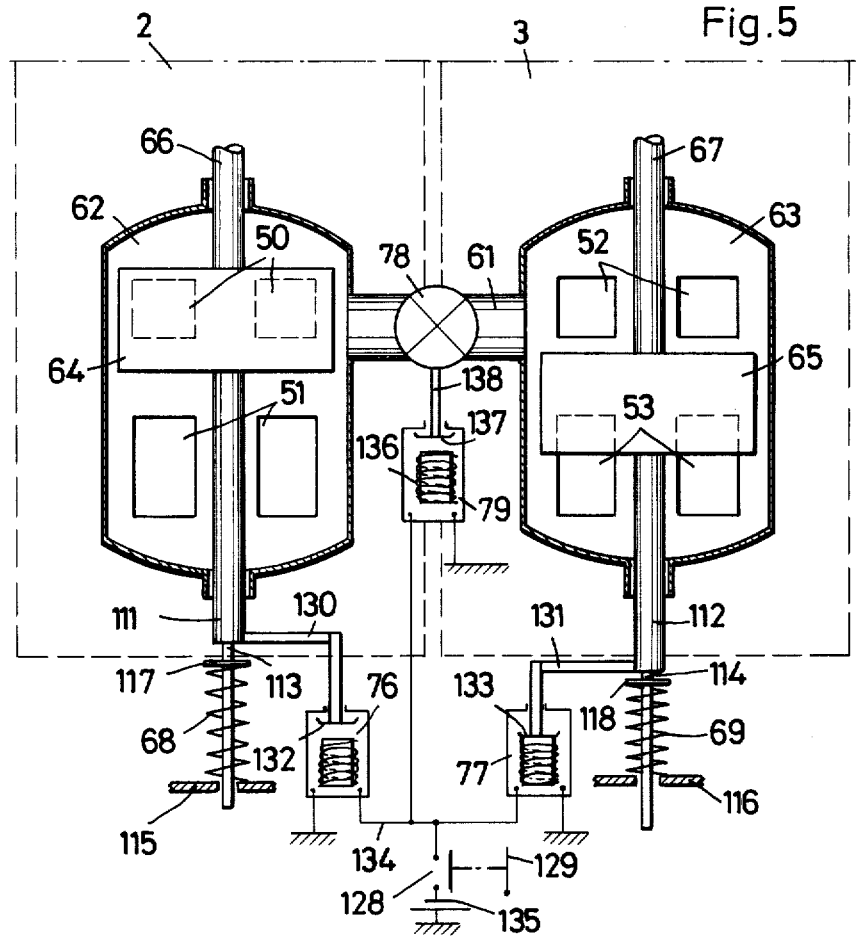
FIG. 5 is a schematic representation of one embodiment of a control for the motor, of which the ducts are shown open from the front.

Reference is now made to FIG. 5. In FIG. 5 is shown the connector duct 61 of valve housings 62, 63 which are arranged on the cylinders 2, 3 and form the transfer conduits. Divided ports 50 and 52 open into the upper ports of the valve housing if for example these come from the pair of cylinders 2, 3 and in the lower part open the ports 51, 53, also divided, which are positioned lower by the piston height but are however elongated. In the valve housings 62, 63, first valve means or slide plates 64, 65 are guided for movement on first valve control means which include valve stems or rods 66, 67, in such a way that the valve plates in one end position, shown to the left of FIG. 5, cover the upper ports 50 and leave the lower ports 51 completely free, whilst in the other end position, shown on the right of FIG. 5, the upper ports 52 are freed and the lower ports 53 are half obstructed.

By way of extensions thereof, the rods 66, 67 are urged by springs 68, 69 against rocker arms and in particular against the rocker arm 28 as is shown particularly clearly in FIG. 2. In FIG. 2, by reference to FIG. 5, the valve plate 65, the rod 67 and the spring 69 can be seen. According to FIG. 2, the rods 66, 67 have extensions 111, 112 and the lower ends thereof which project through seals from the valve housing 62, 63 and which are supported by the springs 68, 69. For example, these springs surround bearings pins 113, 114 in extension of the rods 66, 67. These pins are movably guided through openings in portions 115, 116 of the wall of the motor. Moreover these pins have in the region of their outer ends stops in the form for example of circlips 117, 118 on which the springs 68, 69 abut, their other ends being supported by the wall portions 115, 116. As may be seen from FIG. 2 by reference to the construction of FIG. 6, the extension 119 stands in connection with a rocking lever 70 by a connecting means permitting play or lost motion. To this end, the extension, for example extension 119, has a circlip 120 in a position such as to come into engagement with the rocking lever 70, on which the assembly is carried at the highest position of the rocker arm. This is most clearly shown in FIG. 6. The pivot mounting 71 of the rocking lever 70 is movable as a whole from below by means of an electromagnetic arrangement 72. The electro-magnetic arrangement 72 consists of an electromagnet 121 and an armature 122 which is connected with the pivot mounting.

The rocking lever 70 is attached in a corresponding manner to the other co-ordinated cylinder. A corresponding arrangement is provided for the other co-ordinated pair of cylinders. The height of the pivotal stroke is upwardly limited in that the rocking lever 70 draws the rods 66, 67 downwards and can stop them in their lowest position.

The movement follows in dependence on the actuation of the accelerator pedal 73 which in a position corresponding to the half load point or beyond, closes a circuit 123 by means of a contact arrangement 74 by which the electro-magnetic arrangement is actuated. A battery 124 or other current source is provided in the circuit 123. A bridging contact 126 for the contact arrangement 74 is resiliently mounted on the pedal 73, which also actuates the throttle of the motor in a manner not shown, by means of a link 125, as is shown in particular in FIG. 2.

In FIG. 5, is shown a modification, according to which special solenoids 76, 77 are associated with the individual slides. A switch 128 corresponding to the elements 74, 126 described above is associated with the accelerator pedal 129 in the manner described in connection with FIG. 2.

It is evident that the valve plate stems 66, 67 are always urged downwardly if the exhaust valve is opened, that is the associated valve plate is located in the position of the valve plate 65 in FIG. 5, whilst the valve plates of the associated cylinders take up the position designated by the reference numeral 64. It follows thereby that the compression chambers of the two cylinders are open to the combustion or working chambers, which communicate with the ports 52 of which the exhaust valve 19 is open in the working position of FIG. 4.

The solenoids 76, 77 of FIG. 5 are arranged at lateral projections of the extensions 111, 112 which are connected to the armatures 132, 133 of the solenoids 76, 77. These are connected into a circuit 134 which includes the cell or battery 135 and can be controlled by the switch 128.

If the solenoids 72, 76, 77 of the construction described are actuated, the rods 66, 67 are drawn so far down as to be free of the rocker arms. Thus they take the position corresponding to that of the slide plate 65 shown in FIG. 5.

At the same time second valve means in the form of a valve 78 located in the connector duct 61 can be actuated by means of a second valve control means which may comprise a magnetic positioning device 79 (FIG. 5) or which may comprise a link 80 (FIG. 2), in order to close the connector duct 61 or 60, because on operation over half load the compression chamber feeds into the working chamber at each lower dead center position of the associated piston.

The positioning or adjustment device 79 of FIG. 5 comprises an electromagnet 136 and an associated armature 137 which is connected to the control element 138 of the valve 78. The electromagnet 136 is connected into the circuit 134.

According to FIG. 2, the link 80 is arranged between the pivot mounting, of which the height can be adjusted, and the valve member of the valve 78.

FIG. 6 shows, with reliance on FIG. 5, a schematic representation of the cylinders 2 and 3. The remaining reference numerals are given correspondingly. The rocker arm associated with the exhaust valve 37 is numbered 81 and its actuating cam is numbered 82. The valve plates 64, 65 are in interchanged positions with respect to FIG. 5, that is the valve plate 64 is in the lower position and the valve plate 65 is in the upper position so that because the piston 6 is beginning the exhaust stroke as the position of the cam 82 shows, the exhaust valve 37 is open and the air flows into the working chamber of the cylinder 2 from the compression chamber beneath the pistons 6, 7.

Figure 8:
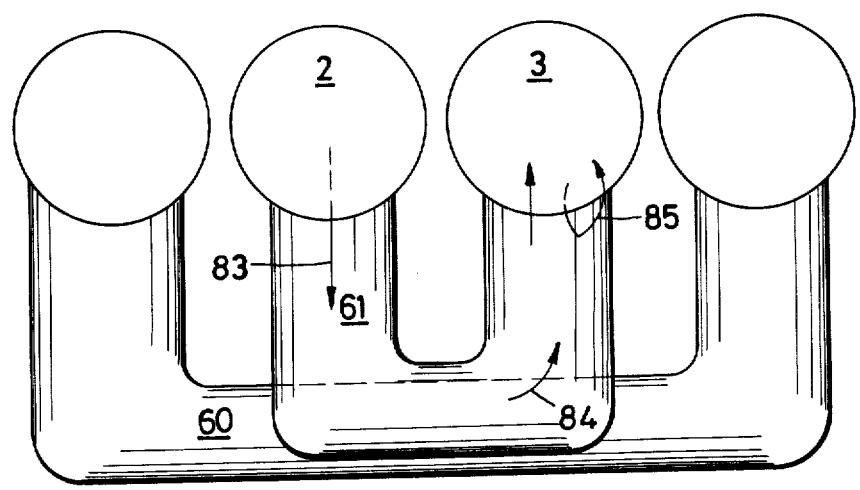

The construction so far described is schematically shown also in FIG. 8 with regard to the flow, however, in the operating position of FIG. 4. It is to be noted that air from the compression chamber of the cylinder 2 flows through the duct 61 according to the arrows 83, 84 into the working chamber of the cylinder 3, at the same time as air flowing in accordance with the arrow 85 is received from the compression chamber of the cylinder 3.

The compression chambers of the cylinders 1 and 4 are in this embodiment ineffective because their pistons are at the upper dead center positions, the piston 8 commencing the power of working stroke.

Figure 7:
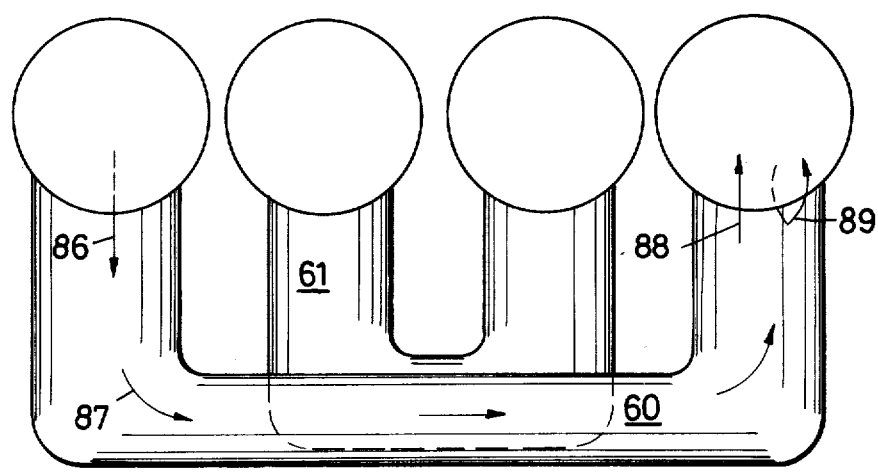
FIGS. 7 and 8 are schematic representations located respectively under FIGS. 3 and 4, for explaining the respective operations in relation to the control devices mentioned.

Thereafter, when working under half load, there is reached the operating position explained with the aid of FIG. 7, that is, the piston 5 because of the plate position urges, through its induction stroke, the air from its compression chamber through the duct 60 in accordance with the arrows 86, 87, 88 into the working chamber of the cylinder 4, which is also supplied from its own compression chamber in accordance with the arrow 89.

Figure 9:
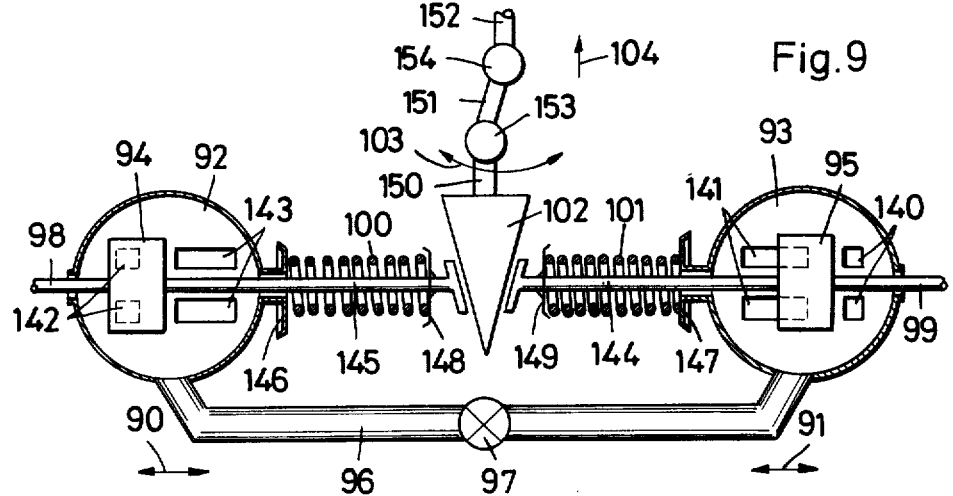
FIG. 9 is an arrangement corresponding to that of FIG. 5, which is suitable for an opposed-cylinder type motor.

FIG. 9 shows a construction modified from that of FIG. 5 for two cylinders, not shown in detail, of a double piston flat twin or opposed cylinder type engine of which associated pistons work in the directions of the double arrows 90, 91. Correspondingly to the earlier embodiments, there are provided valve housings 92, 93 with pairs of openings or ports 140 through 143 over which are movable slide plates 94, 95 in order correspondingly to feed a connector duct 96 in which is arranged a valve device 97. The pairs of ports 140 through 143 correspond to the pairs of ports 50 through 53 of FIG. 5.

The slide rods 98, 99 are actuated by rocker arms in the construction described which are arranged outside FIG. 9 and are not represented in detail. They operate in a way corresponding to that of the rocker arms previously described.

In this embodiment, the slide plates are urged by springs 100, 101 arranged on extensions 144, 145 of the slide rods 98, 99 against a tapered spacer of wedge-shaped distance piece 102 which can pivot in the directions of the double arrow 103 and therewith follow the alternating to and fro movements of the slide plates 94, 95.

The springs 100, 101 engaged at one side by abutments 146, 147 fast to the motor and at the other side by abutments 148, 149 on the extensions 144, 145. The wedge-shaped distance piece 102 is supported by means of a shaft 150 on an intermediate arm 151 which is connected at the one end with the shaft and the other end with a rod 152 by pivots 153, 154 so as to be movable in accordance with the double arrow 103.

The arrangement of the openings 140 through 143 in connection with the functioning of the slide plates 94, 95 corresponds with that of the embodiment of FIG. 5.

It will be noted with reference to FIG. 9 that on changing to full load the wedge-shaped distance piece 102 comes upwardly correspondingly to the arrow 104. This movement corresponds to the movement of the pivot mounting 71 in FIG. 6. By the movement of the wedge-shaped distance piece 102, both the slide rods or stems 98, 99 are withdrawn from the associated rocker arms. The slide rods are supported by means of the springs 100, 101 in such a position that the slide plates 94, 95 are located as shown in the case of the slide plate 95. By the outward movement of the distance piece 102, the valve 97 which was previously open is at the same time closed.

Figure 10:
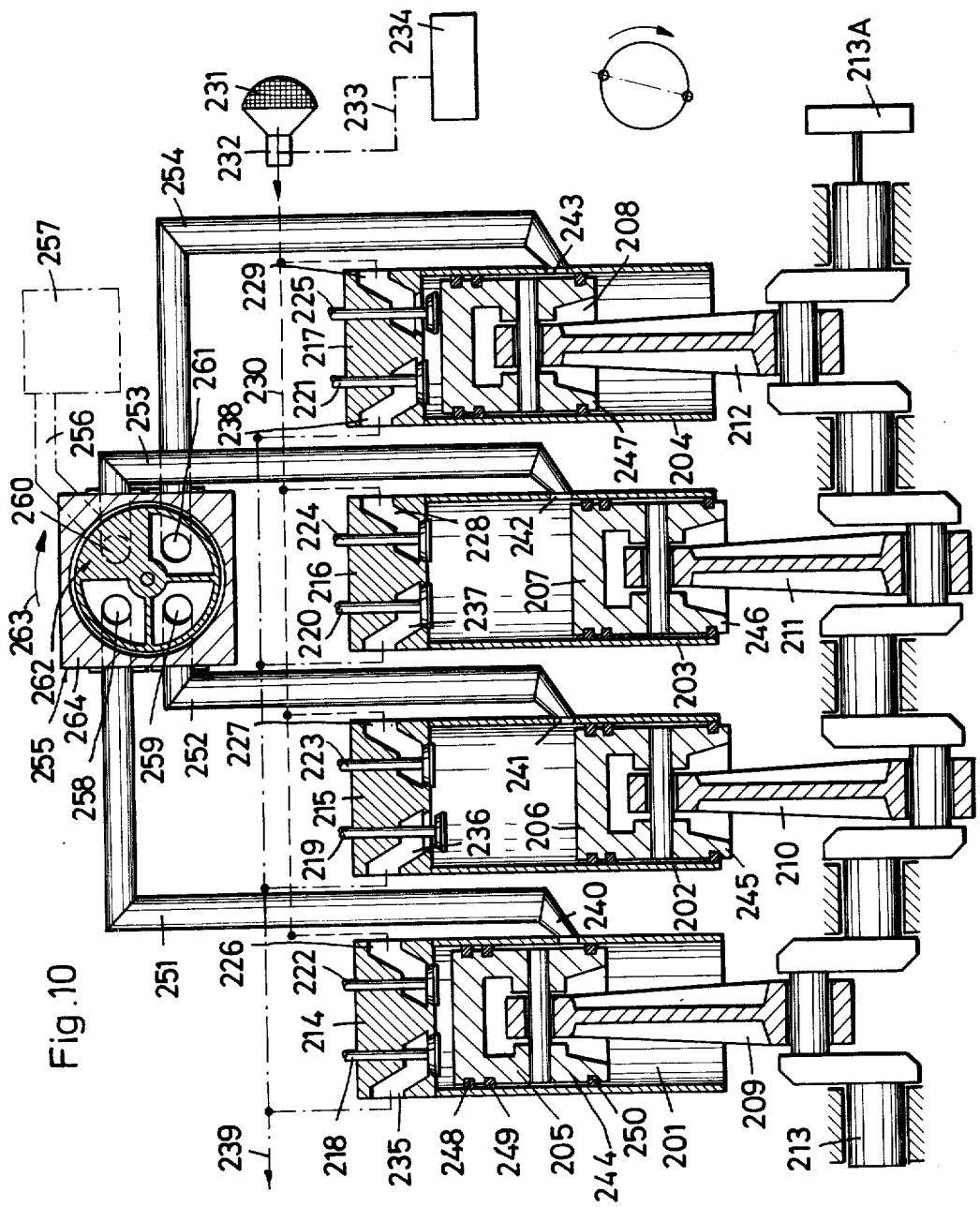
FIG. 10 is a schematic side view of a four cylinder four-stroke engine with associated rotary valve.
Figure 11:
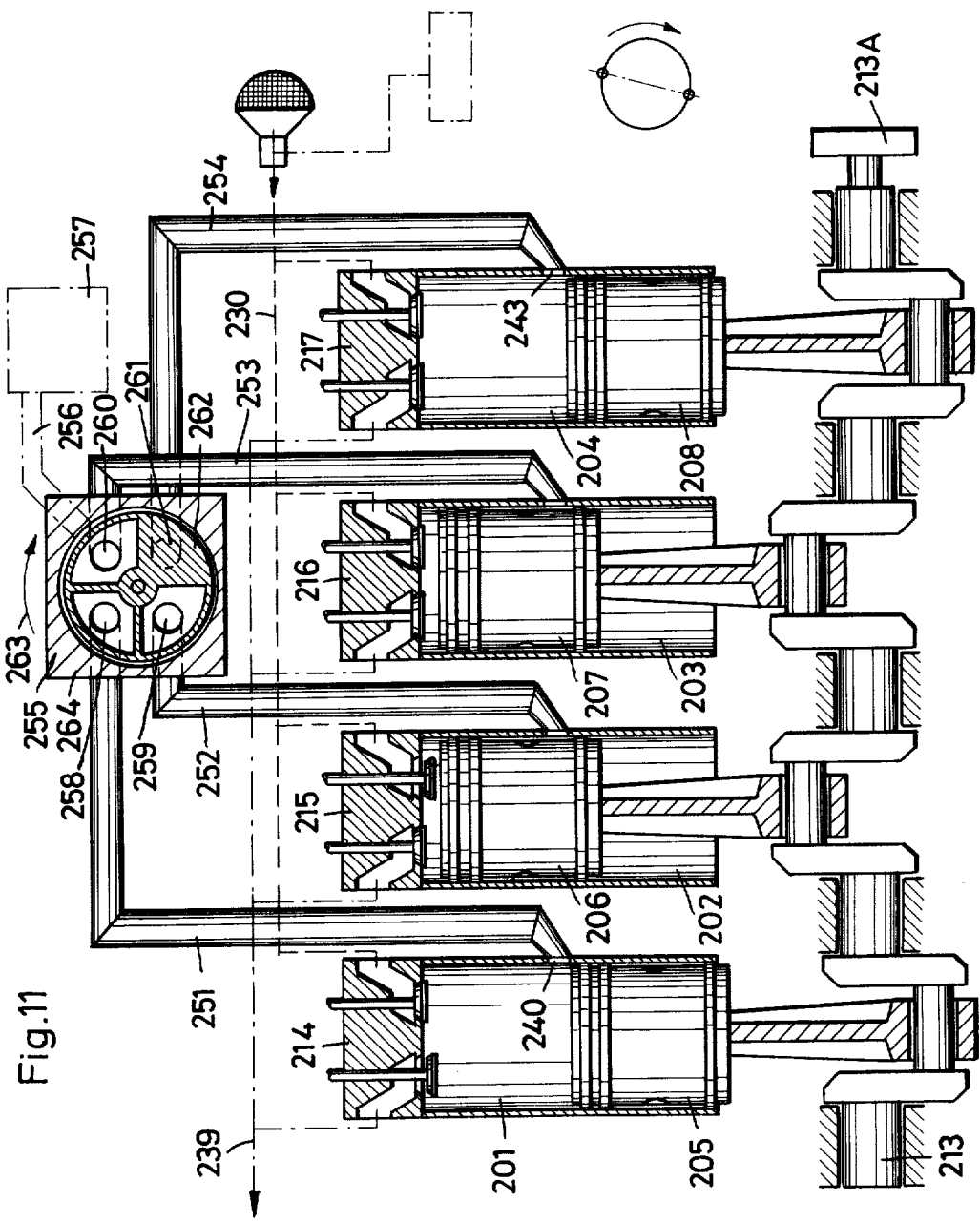
FIG. 11 is a view similar to FIG. 10 but showing the engine in a different operating position.

With reference to FIGS. 10-19, shall now be described the inventive method with respect to a four cylinder fourstroke engine of a more conventional design. In FIGS. 10 and 11, the four cylinder four-stroke engine comprises four in-line cylinders 201, 202, 203 and 204. Each cylinder slidably mounts a piston 205, 206, 207 and 208 respectively. Each piston is connected by a piston rod 209, 210, 211 or 212 respectively to the crank shaft 213 of the engine. Each cylinder includes an ignition device or an injection nozzle not shown. Each cylinder head 214, 215, 216 and 217 respectively includes an outlet or exhaust valve 218, 219, 220 or 221 respectively and an inlet valve 222, 223, 224 or 225 respectively. The inlet and exhaust valves are actuated in a known manner by means of a cam shaft as will be explained further below with reference to FIG. 12. The inlet valves serve to obstruct the inlet ducts 226, 227, 228 or 229 respectively that are connected through a manifold 230 to an intake assembly 231 with a throttle assembly 232. The manifold assembly may be connected by a conduit 233 to a fuel tank 234. The crank shaft 213 mounts at one end a take-off member by which the engine may be coupled to a driven member. The take-off member is indicated by 213 A.

The exhaust valves 218 through 221 serve to obstruct exhaust associated exhaust ducts 235, 236, 237 or 238 respectively which are connected to a common exhaust manifold 239 leading to the usual exhaust pipe.

The ignition sequence is as follows: Cylinders 201-203-204-202, i.e. when cylinder 201 begins with the working cycle the cylinder 202 begins with the exhaust stroke or respectively the scavenging cycle, the cylinder 203 begins with the compression stroke and the cylinder 204 begins the intake or induction stroke.

Each of the four cylinders includes a connecting port 240, 241, 242 or 243 respectively at a location of the cylinder walls which is immediately above the cylinder head when the piston is in its bottom dead center position, as may be seen clearly at the cylinders 202 and 203. The length or vertical extensions of the pistons 205 through 208 is selected such or respectively these pistons are provided with a piston skirt 242, 245, 246 or 247 respectively so that in any upwardly directed movement of the piston from its bottom dead center position the connecting ports 240 though 243 will be continuously obstructed until the piston is again in its bottom dead center position. This provides for the normal control of the connecting ports 240 through 243. In the here described embodiment and as indicated for piston 205, two piston rings 248, 249 are disposed at the upper end of the piston, and another piston ring 250 is disposed at the lower end of the piston skirt so that the piston positively obstructs the connecting ports. It goes without saying that the pistons may be provided with a special slide element (not shown) for controlling the connecting ports.

The connecting ports are connected through conduits 251, 252, 253 and 254 respectively to a rotary slide valve assembly 255. The slide valve assembly 254 is connected by a supply conduit 256 to a compressor 257 which in this embodiment constitutes the source of compressed air.

The compressor 257 may be driven by the engine or by a separate aggregate. The conduit connecting the compressor to the rotary slide valve assembly opens into a cavity of the latter in which is rotatably mounted a disc-shaped rotary slide valve member 262 in front of outlet ports 258, 259, 260 and 261. In any rotational position, the slide valve disc 262 obstructs one of the outlet ports connected to one of the conduits 251 through 254. The slide valve disc rotates at the same speed as the cam shaft actuating the valves 218 through 225, i.e. rotates at half the speed of the crank shaft 213. When the crank shaft 213 rotates through 180 degrees, the rotary slide valve disc 262 rotates through an angle of 90 degrees.

As may be seen from the embodiment shown in FIG. 10, the control provided by the rotary slide valve disc 262 is superposed on the control of the connecting ports 240 through 243 by means of the respective piston skirts. In the illustrated operating position, the working or combustion chambers of the cylinders 201 and 204 are already blocked by the pistons 205 and 208 respectively. The working chamber above the piston 206 is as shown in the illustrated position freely connected to the compressed air source, i.e. the compressor 257, whereas the connecting port 242 is blocked by the slide valve disc 262. The illustrated embodiment corresponds to an operation of the engine at low load or low output power, i.e. low speed whereby the total air output of the compressor is discharged into the working chamber above the piston 203 which means that in the scavenging cycle cold air is introduced into the cylinder immediately above the piston head, and this cold air effects a sudden cooling of the hot exhaust gases.

As indicated by the arrow 263, the rotational position of the slide valve housing may be altered with respect to the slide valve disc. FIG. 11 illustrates these two members in a modified rotational relationship when the cam shaft has rotated through 180 degrees and the valve disc 262 has rotated through 90 degrees. In this position, the conduit 251 connects the working chamber above the piston 205 which begins its exhaust stroke to the valve assembly. The cylinders 202 and 203 are separated from the compressor 257 by the upwardly moved pistons 206 and 207 respectively whereas the working chamber above the piston 208 which is in its bottom dead center position within the cylinder 204 is separated from the compressor 257 by the slide valve disc 262. With respect to the cylinder sequence, FIG. 11 shows that cylinder 201 begins an exhaust stroke with scavenging, cylinder 202 begins an intake stroke, cylinder 203 has terminated the compression stroke and cylinder 204 begins with its compression stroke.

When now rotating the slide valve housing 264 in the direction of the arrow 263 through an angle of 90° in thus correspondingly rotationally displacing the outlet ports 258 through 261 — or rotating the slide valve disc 262 through a corresponding angle in the opposite sense — then it may be seen that in the working condition of FIG. 10 the conduit 251 leading to the connecting port 240 will be blocked, and that this port is already being blocked by the piston 205. The other conduits 252, 253 and 254 will, however, be connected whereby the latter conduit 254 is blocked by the piston 208 or the piston skirt 247 respectively. Compressed air will be discharged into the working chambers above the pistons 206 and 207, i.e. prior to the exhaust stroke and prior to the compression stroke so that scavenging is effected with a smaller quantity of compressed air than in the above described embodiment, and there is likewise effected a supercharging prior to the compression stroke. This operation corresponds to an engine operation at higher speeds or at a higher output power, particularly in the upper half of the output power range of the engine.

Furthermore it may be seen that a certain minimum pressure must be supplied, and that this minimum pressure must be higher than the pressure existing for example in the cylinder 203 prior to the compression stroke, and for supercharging there must likewise be provided an over-pressure. In a preferred embodiment, the air volume supplied amounts to double or twice the volume of air of the working chamber above the piston 207, and the compressor 257 is rated accordingly.

The same operation may likewise be obtained when rotating the slide valve housing 264 of the rotary slide valve assembly through an angle of 90° in the direction of the arrow 263 in thus correspondingly displacing the outlet ports. Then the conduits 251 and 254 will be open so that there may be obtained the method of operation as described with reference to FIG. 10.

Figure 12:
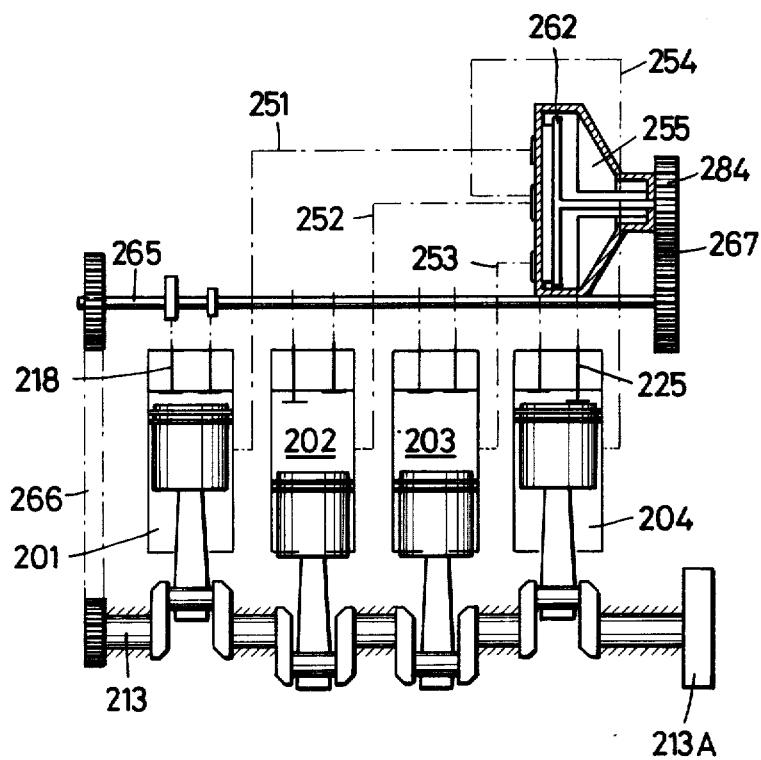
FIG. 12 is a schematic view of the motor of FIGS. 10 and 11 to illustrate the drive connections between crank shaft, cam shaft and rotary valve.

FIG. 12 is a schematic illustration of the drive connections of the engine. The valves 218 through 225 are controlled by a cam shaft 265, and this cam shaft 265 is driven by the crank shaft 213 through a gear transmission 266 in a ratio of 1:2, i.e. that the cam shaft rotates at half the rotational speed of the crank shaft 213. The rotary slide valve disc 262 of the rotary slide valve assembly 255 is driven by the cam shaft 265 through a gear transmission 267 in a ratio of 1:1, i.e. rotates at half the speed of the crank shaft 213. The furthermore shown conduits are designated by the same reference numerals as in FIGS. 10 and 11.

Figure 13:
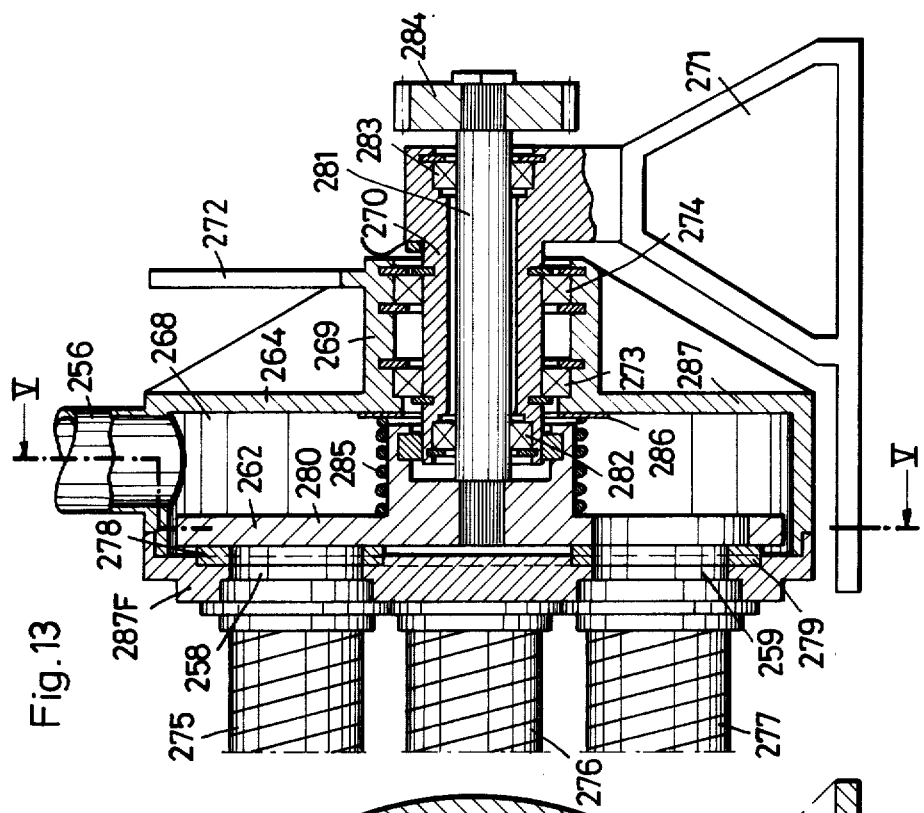
FIG. 13 is a fragmentary, enlarged lateral cross-sectional view of the rotary slide valve.
Figure 14:
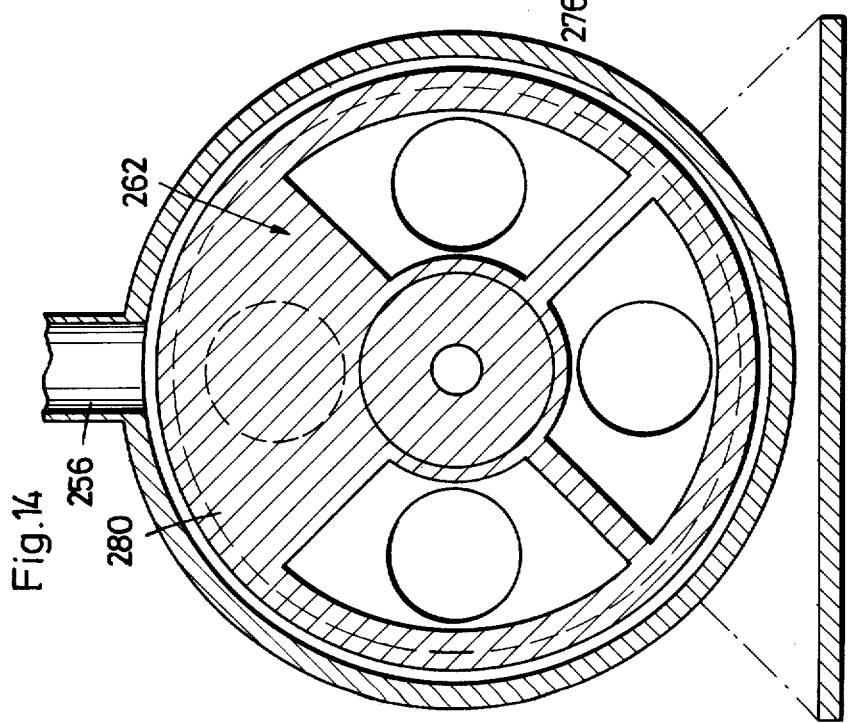
FIG. 14 is a cross-sectional view along the line V—V of FIG. 13.

Referring to FIGS. 13 and 14, there is shown the rotary slide valve assembly 255 in a larger scale. The supply conduit 256 connects the slide valve to a compressor not shown and opens into a cavity 268 in which the rotary slide valve disc 262 is rotatably mounted. The slide valve housing 264 includes a projecting portion 269 by which the housing is rotatably mounted on a support 270. The support 270 is secured to the engine by means of a console-type mounting 271. The projecting portion 269 includes a positioning lever 272 for rotating the housing which is mounted in bearings 273 and 274. A face wall 287F of the housing defines the outlet ports 258 through 261 which are connected by flexible connectors such as the connectors 275, 276 and 277 respectively to the conduits 251 through 254 respectively. The conduits are connected in any suitable manner. FIG. 13 shows merely two outlet ports such as the outlet ports 258 and 259. Internally of the housing, these outlet ports are provided with an annular gasket 278 or 279 respectively which engage the rotating slide valve disc 262. The slide valve disc 262 includes a blocking sector 280 of an angular extension of for example 90°, as may likewise be seen from FIGS. 10 and 11. This blocking sector may likewise be of a smaller extension and may particularly be smaller at one side in thus allowing adjustments of less than 90° for altering the operation. The blocking sector 280 is shown in FIGS. 13 and 14.

The rotary slide valve disc 262 is secured to a shaft 281 which extends through the support 270 and is journalled therein by bearings 282, 283. At its outer end, the shaft 281 mounts a gear wheel 284 which corresponds to the identically referenced gear wheel 284 of the gear transmission 267 shown in FIG. 12. Suitable seals are provided at the point where the shaft 281 extends through the housing. Mounted on the hub of the rotary slide valve disc 262 is a compression spring 285 bearing at its other end through an intermediate thrust ring 286 against the housing wall 287 and urging the rotary slide valve disc against the annular gaskets such as 278, 279.

The slide valve disc rotates in unison with the engine. By manipulating the positioning lever 272 the operation of the valve controller may be modified, as will be explained with reference to FIG. 15.

Figure 15:
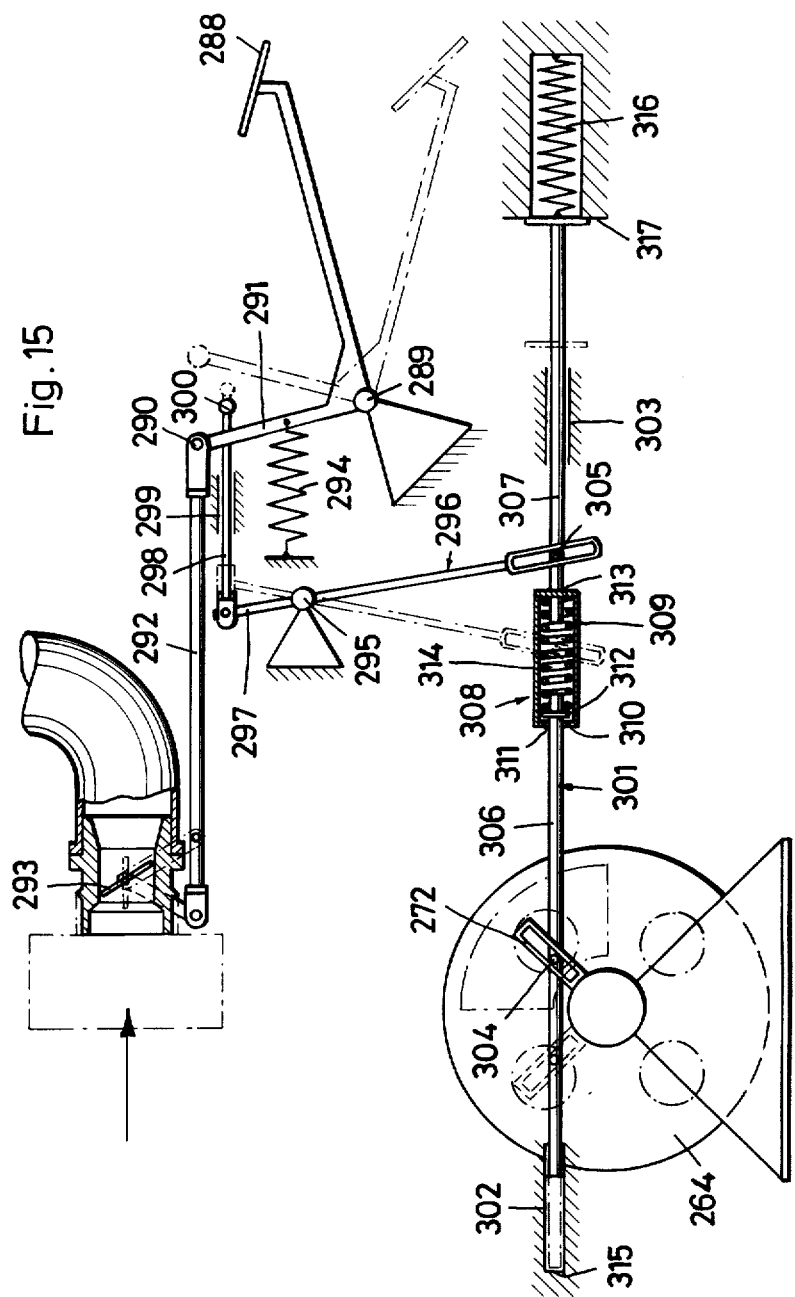
FIG. 15 is a schematic illustration of a drive connection between the rotary valve housing and the accelerator pedal of an engine.

Referring to FIG. 15, it is assumed that the valve controller is arranged in an accelerator pedal controlled internal combustion engine, for example in a motor vehicle. Accelerator control may be employed in all types of application. In engines for stationary usage the accelerator pedal would of course be replaced by a corresponding control lever.

The accelerator pedal lever 288 includes a leg 291 which is connected by an articulation 290 to a linkage 292 for actuating the throttle 293 in a well known manner. The accelerator pedal may otherwise be conventional and journalled in a pivot mounting 289. The leg 291 is biased by a spring 294 which biases the pedal lever 288 into a normal or "rest" position as shown in full lines in FIG. 15. The pedal lever 288 is rotatably mounted on a pivot mounting 289. Another pivot mounting 295 for a two-armed pivot lever 296 is mounted in the vicinity of the pivot mounting 289. The shorter arm 297 of the pivot lever 296 is rotatably connected to a biasing lever 298. This rotational connection may consist of a stud engaging an elongated hole. The biasing lever 298 is axially movable in a slide bearing 299 so that the biasing lever 298 may move past the le 291. At its right hand end as shown in FIG. 15, the biasing lever 298 mounts a transverse lug 300 projecting into the path of movement of the pedal lever leg 291 to the right side of the leg as seen in the drawing. An adjusting linkage generally indicated by 301 extends close to a side wall of the slide valve housing 264 and is movably mounted in its axial direction by means of bearings 302, 303. The adjusting linkage 301 includes a lug 304 engaging a longitudinal slot of the positioning lever 272. Another transverse lug 305 connects the adjusting linkage to the longer arm of the pivot lever 296, and this longer arm includes a longitudinal slot into which engages the transverse lug 305. The adjusting linkage 301 is separated substantially midway into two linkage members 306 and 307 mutually connected by a lost-motion connector assembly 308. The connector assembly 308 may consist of a cylindrical sleeve 309 connected to the linkage member 307, the sleeve having at its free end an inwardly directed rim portion 310. Through the aperture 311 in the rim extends the adjacent end of the other linkage member 306 having a flange 312 at its end disposed within the sleeve 309. A compression spring 314 is interposed between this flange 312 and the bottom wall 313 of the sleeve connected to the member 307.

It will now be assumed that in the normal position as shown the rotary slide valve assembly is in a position corresponding to an operation at low load or low output power. When depressing the accelerator pedal 288, initially the position of the throttle 293 will be altered without interfering however with the rotary slide valve. When depressing the accelerator pedal lever 288 more the leg 291 engages the transverse lug 300 and pulls the upper end of the pivot lever 296 in clockwise direction toward the right as seen in FIG. 15. Because of the lever ratio of the two-armed pivot lever 296, a relatively small movement of the biasing lever 298 results in a relatively large movement of the positioning lever 272. The lost-motion connection ensures that when further depressing the pedal 288 the positioning lever 272 will not be moved. To this end, the bearing 302 is provided with an axial stop 315 for delimiting the maximum translational movement of the linkage member 306 to the left. The linkage member 307 is preferably connected to a return spring 316 for withdrawing the adjusting linkage 301 when the pedal lever 288 is released. The return movement of the adjusting linkage 301 may be delimited by a corresponding stop 317.

Referring to FIGS. 16–19, parts common to both modified embodiments are designated by the same reference numerals.

Figure 16:
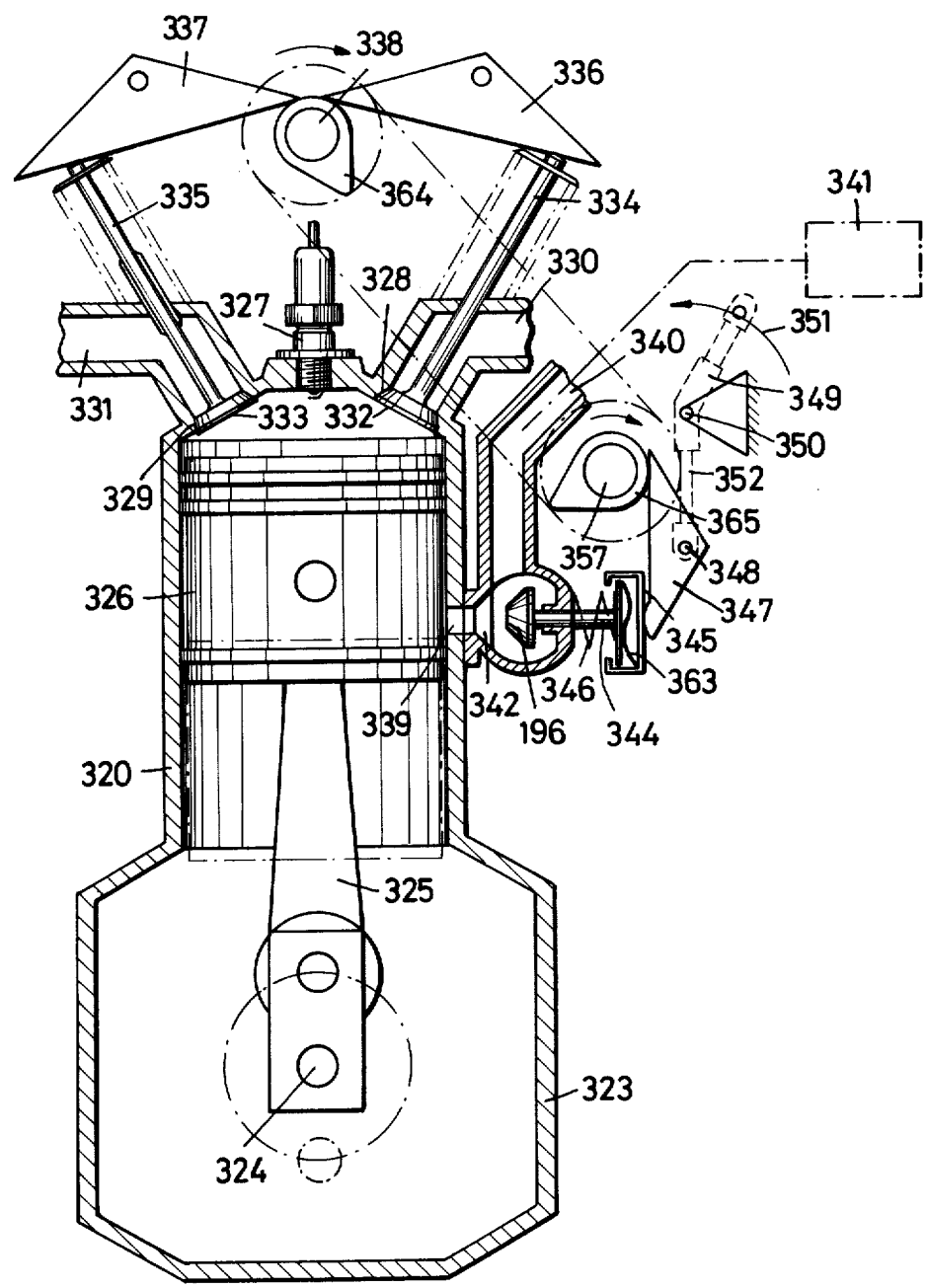
FIG. 16 is a front elevational cross-sectional view of the cylinder-piston arrangement of a motor along the line VII—VII of FIG. 17.
Figure 17:
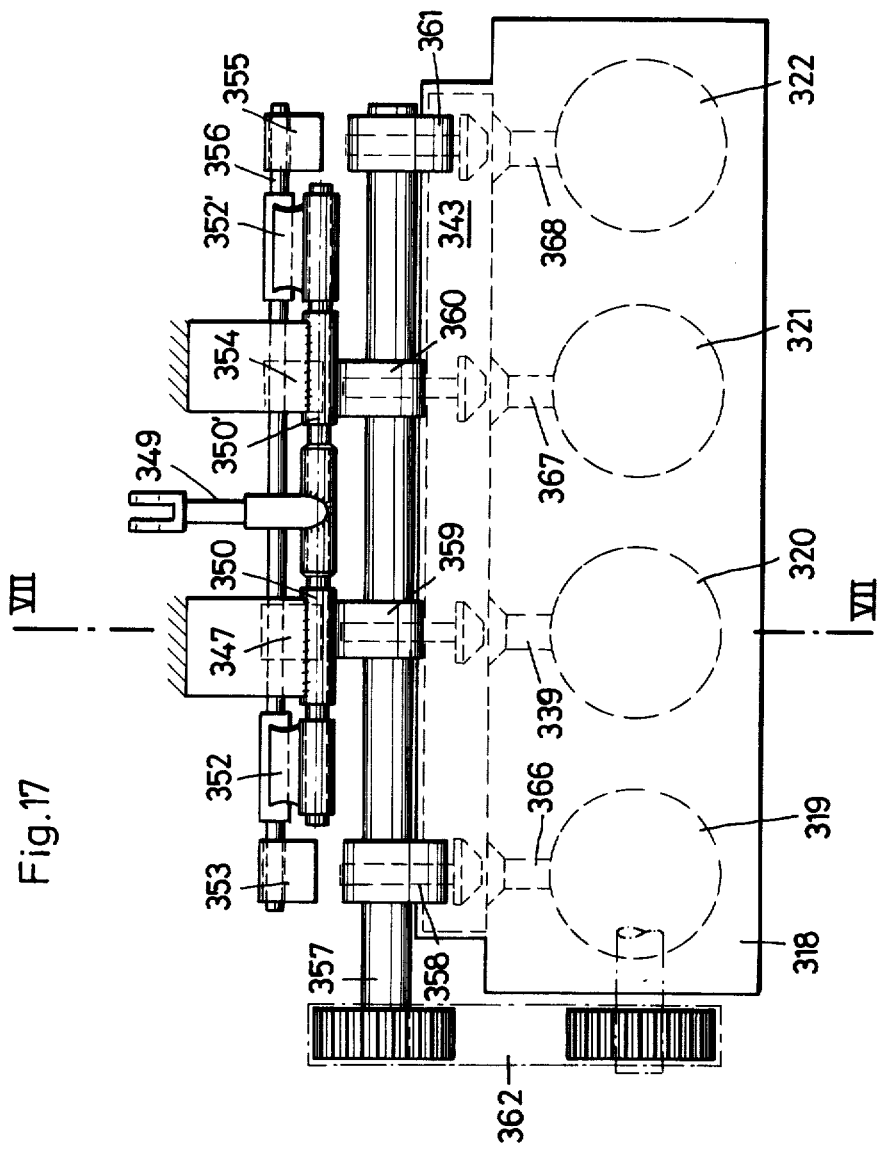
FIG. 17 is a top view of the motor shown in FIG. 16.
Figure 18:
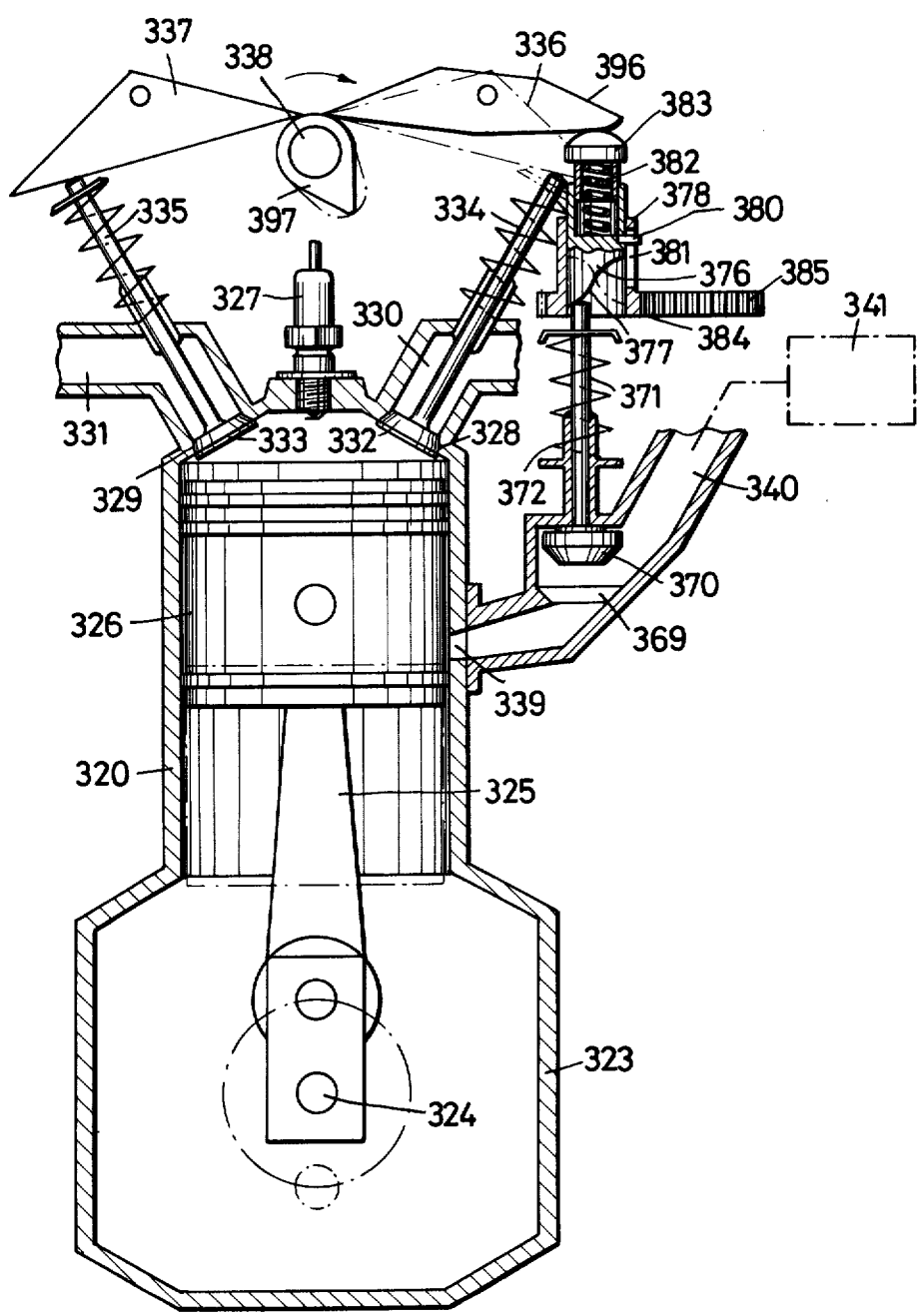
FIG. 18 is a view similar to FIG. 16 but showing a modified embodiment.

A cylinder block generally indicated at 318 (in FIGS. 17 and 19) includes four cylinders 319 through 322 of which one cylinder, the cylinder 320, is shown in FIGS. 16 and 18. This cylinder is connected to the crank case 323 in which the crank shaft 324 is rotatably mounted and is connected through a piston rod 325 to the piston 326. In the cylinder head is provided an ignition or injection device such as the spark plug 327 which is connected in the conventional manner to a distributor. The cylinder head furthermore comprises an inlet port 328 connected to an intake conduit 330, and an exhaust port 329 connected to an exhaust conduit 331. The intake conduit is connected to a throttle or carburator assembly which is in turn connected to a fuel tank (not shown). These parts are conventional. The inlet valves 332 and the exhaust valves 333 are controlled by valve stems or push rods 334 and 335 respectively by means of a rocker lever 336 or 337 respectively, and these rocker levers are driven in a conventional manner by a cam shaft 338. The valve stems are provided with springs which serve in a conventional manner to urge the valve bodies against their respective valve seats. As may be seen from FIG. 17, the cam shaft is driven through a gear transmission by the crank shaft. The transmission ratio of the transmission is 1:2.

The cylinders 320 include connecting ports 339 which are arranged at the same relative positions as the connecting ports 240 through 243 of FIG. 10, i.e. in a location immediately above the piston head when the piston is in its bottom dead center position. The connecting ports are connected to a compressor 341 through ducts or conduits 340.

In the following, there will first be described the embodiment shown in FIGS. 16 and 17. As may be seen therefrom, a valve seat 342 is provided at each connecting port 339 in every cylinder 319 through 322. These valve seats may be formed integrally in a manifold 343 which is connected to the compressor 341 by the conduit 340. Each valve seat 342 is provided with an associated valve body 196 with a push rod 344 extending through the wall of the manifold 343. The push rod 344 is provided with a head portion 345 defining a support for a spring 346 tending to lift off the valve body from its seat 342. The head portion 345 may be engaged by a rocker lever 347 mounted in a pivot mounting 348 of a rotatably mounted positioning lever 349. This positioning lever 349 is rotatably mounted at a stationary pivot 350 secured with respect to the engine or the crank case. The positioning lever may be adjusted in the direction of the arrow 351. With the reference 349 is indicated the upper part of the positioning lever which may also be seen in FIG. 17. The lower arm 352 of the positioning lever mounts at its lower end a bifurcated portion. The respective pivot mountings are indicated in FIG. 17 by the reference numerals 350 and 350'. As may be seen from FIG. 17, there are provided altogether four rocker levers of the same design as the rocker lever 347, and the other three rocker levers are indicated by 353, 354 and 355 respectively. These rocker levers are rotatably mounted on a rod 356 which passes through the pivot mounting 348 shown in FIG. 16.

A cam shaft 357 associated with the rocker levers 347 and 353 through 355 mounts four cams 358, 359, 360 and 361, i.e. one cam for each head portion 345 of a push rod 344.

The cam shaft 357 is coupled to the cam shaft 338 actuating the valve stems or push rods 334, 335 in the conventional manner through a transmission 362 which is likewise shown in FIG. 17 and comprises a ratio of 1:1.

In the position shown in FIG. 16, the rocker levers 347 and 353 through 355 engage the cams 358 through 361 respectively on the one hand, and the head portions 345 of the push rods on the other hand. The head portions may additionally be provided with a spring 363 the purpose of which is to allow tight engagement of the valve body 196 against the seat 342, and the same of course applies analogously to the corresponding parts of the other cylinders.

From the position shown in FIG. 16 may be seen, and this will also be realized from inspection of the cams 364 and 365 which are mutually displaced by 90° and are arranged on the respective cam shafts 338 and 357 in one and the same cylinder position that the connecting port valve seat 342 will always be closed when the piston 326 is in its bottom dead center position prior to beginning a compression stroke. The valve port will only be opened when the piston is in its bottom dead center position prior to beginning an exhaust stroke. In that case, a multiple of the quantity of gas contained within the cylinder will be introduced into the cylinder, due to the compressed air supply available in the manifold 343.

When moving the positioning lever 349 in the direction of the arrow 351 shown in FIG. 16, the pivot mounting 348 or respectively the rod 356 of this pivot mounting is moved away from the cylinder block so that all valve bodies will remain in the open position. The connecting ports 339, 366, 367 and 368 will then be controlled merely by the piston 326 or the respective piston skirt so that compressed air supplied from the compressor 341 will be introduced into the cylinder prior to each upwardly directed stroke. The embodiment of FIGS. 16 and 17 therefore illustrates a controlled valve assembly that may be employed with suitable modifications also in other types of motors.

Figure 19:
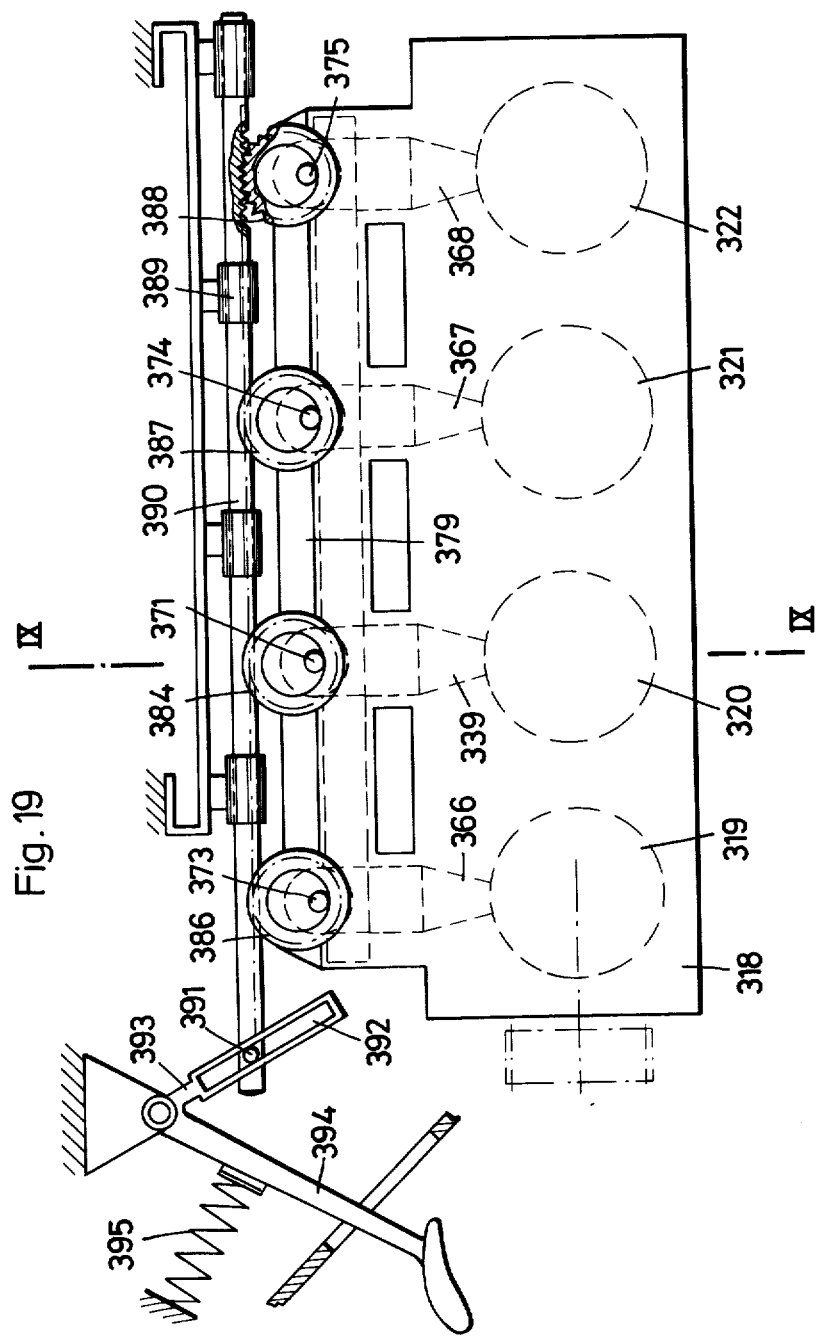
FIG. 19 is a top view of the motor shown in FIG. 18.

In FIGS. 18 and 19 is shown a modified embodiment. The connecting ports 339, 366, 367 and 368 shown therein are each controlled by a valve seat 369 disposed in the conduit 340 and having an associated valve body 370. The push rod 371 of the valve body 370 is biased by a spring 372 tending to lift off the valve body 370 from its valve seat. Each push rod 371 and 373 through 375 is actuated by an associated cam 376. The cam 376 includes a contoured engagement surface 377 for the push rod and may be reciprocated within a sleeve-type guide 378. This guide is rotatably mounted within a mounting assembly 379 secured to the engine. The cam 376 is secured against rotation by a lug 380 engaging an axial slot 381 of the sleeve-type guide 378. The cam 376 engages through a push rod 383 with a spring 382 a rocker lever 396 adapted to be actuated by a separate cam 397 on the cam shaft 338.

As may be seen in FIG. 18, the guide 378 includes a gear rim 384 meshing with a gear 385. This gear may be adjusted in dependence on the speed or output power of the engine, i.e. in dependence on the position of the accelerator pedal to rotate the cam 376 so that either the longest part of the cam continuously engages the push rod 371 and the corresponding other cams engage the corresponding other push rods, or that the cam may be actuated by this push rod during idling operation of the engine. This allows the above described control.

In FIG. 19 may be seen the gear rim 384 and the gear rims 386, 387 and 388 of the remaining guides. These gear rims mesh with a rack 390 which as shown in FIG. 19 is journalled in bearings 389 fixed to the engine. One end of the rack 390 mounts a transverse lug 391 engaging a longitudinal slot 392 of a lever arm 393 connected to the accelerator pedal 394. This allows to modify the adjustment by the cams 376 in dependence on the position of the accelerator pedal in a manner so that compressed air is supplied either prior to each upwardly directed stroke of the pistons or only prior to each exhaust stroke. The accelerator pedal 394 is biased by a spring 395 in the conventional manner.

The sources of compressed air 257 and 341 may comprise compressors driven by an electric motor or coupled to the engine crank shaft through adjustable gearing in order to ensure a sufficient supply of compressed air even at low engine speeds.

The embodiments of the present invention in which an exclusive property or privilege is claimed are defined as follows:

1. A multi-cylinder valve-controlled four-stroke internal combustion engine comprising an engine cam shaft, a plurality of pistons, cylinder means defining a combustion chamber on one side of each of said pistons and a pumping chamber on the opposite side of each, means at the underside of each piston functioning as a compression and scavenging pump, transfer ports in the pumping chamber controlled by the edge of the piston, transfer conduits connecting said ports with the cylinder combustion chamber, connector pipes between the transfer conduits of cylinders, transfer valves controlling connection of the transfer conduits through said connection pipes, and control means controlling operation of the transfer valves in dependence on the engine cam shaft, the control means being responsive to operation of the engine at half load or less to so control operation of the transfer valves that a cylinder operating as a pump additionally contains the compressed air from the pump chamber of a cylinder of which the piston works at a phase displacement of 180°.

2. An internal combustion engine comprising, in combination, a plurality of cylinders, piston means comprising at least one pair of pistons each movable in unison with the other, respectively, in one cylinder of at least a pair of said cylinders through an operating cycle which includes an exhaust stroke, each of the cylinders of said at least a pair of cylinders being configured to define a combustion chamber on one side of said piston means and an air compression chamber on the opposite side of said piston means, first port means opening into each of said combustion chambers, second port means opening into each of said compression chambers, first conduit means connecting in flow communication the first port means of each of said at least a pair of cylinders with the second port means of the same cylinder, first valve means for each of the cylinders of said at least a pair of cylinders operable to individually open and close each of said first port means thereof, second conduit means interconnecting in flow communication the first conduit means of each of said at least a pair of cylinders, second valve means for opening and closing flow communication through said second conduit means, first valve control means operatively individually associated with each of the cylinders of said at least a pair of cylinders for operating said first valve means to enable fluid flow between said second and said first port means during an exhaust stroke of said piston means, and second valve control means for operating said second valve means to open and close flow communication through said second conduit means in accordance with a preselected condition to selectively enable fluid flow from the air compression chamber of one of the cylinders of said at least a pair of cylinders to the combustion chamber of the other cylinder of said at least a pair of cylinders.

3. An engine according to claim 1 including throttle means operable to effect operation of said engine through an operating range up to a full load condition and throttle control means wherein said preselected condition is operation of said engine at one half said full load condition, said second valve control means including means responsive to the operating condition of said engine for closing said second valve means when said engine is operating at a condition greater than said one half full load condition.

4. An engine according to claim 1 wherein each of said pistons of said at least one pair of pistons is configured to comprise a height dimension extending parallel to the direction of movement of said pistons in said cylinders, said first and second port means in each cylinder of said at least a pair of cylinders being spaced apart in the direction of the operating stroke of said piston by a distance substantially equivalent to said height dimension of said piston.

5. An engine according to claim 3 wherein said second port means are configured to provide a wider opening extending in the direction of piston travel than said first port means.

6. An engine according to claim 5 including intake and exhaust valve means operatively associated with said combustion chambers and cam means for controlling operation of said intake and exhaust valve means, said first valve control means including means responsive to operation of said cam means for controlling said first valve means such that said second port means are maintained fully opened when said first port means are closed and such that said second port means are partially opened when said first port means are opened.

7. An engine according to claim 6 wherein said cam means include rocker arm means for controlling operation of said exhaust valve means, and wherein said first valve control means include valve stem means operatively connected to said first valve means and arranged for engagement with said rocker arm means, said rocker arm means being arranged to act upon said valve stem means to effect actuation of said first valve means.

8. An engine according to claim 7, including throttle means for controlling operation of said engine, spring means urging said valve stem means against said rocker arm means, and setting means connected with said throttle means, said setting means being actuable to move said valve stem means away from said rocker arm means so that movement of said rocker arm means will have no effect on said valve stem means.

9. An engine according to claim 7, wherein said at least a pair of cylinders are arranged in opposed relationship, said engine including a distance piece, means supporting said valve stem means of said at least a pair of cylinders in engagement with said distance piece, and means for moving said distance piece to disengage said valve stem means from said rocker arm means.

10. An engine according to claim 9 wherein said distance piece is wedge-shaped.

11. An engine according to claim 7 including throttle means for controlling operation of said engine and wherein said first and said second valve control means are configured to jointly comprise pivotal mounting means, pivot arm means movable about said pivotal mounting means, said valve stem means standing in engagement with said pivot arm means, a movable positioning device carrying said pivotal mounting means, and means for moving said positioning device in dependence upon the position of said throttle means whereby said valve stem means at a predetermined position of said throttle means are moved to a position at which said second valve control means open said second valve means.

12. An engine according to claim 11 wherein said positioning device comprises solenoid means.

* * * * *